July 17, 1923. 1,462,048
T. D. RICHARDS
APPARATUS FOR CLEANING AND CLARIFYING USED LUBRICATING OIL
Filed Sept. 23, 1922 2 Sheets-Sheet 1
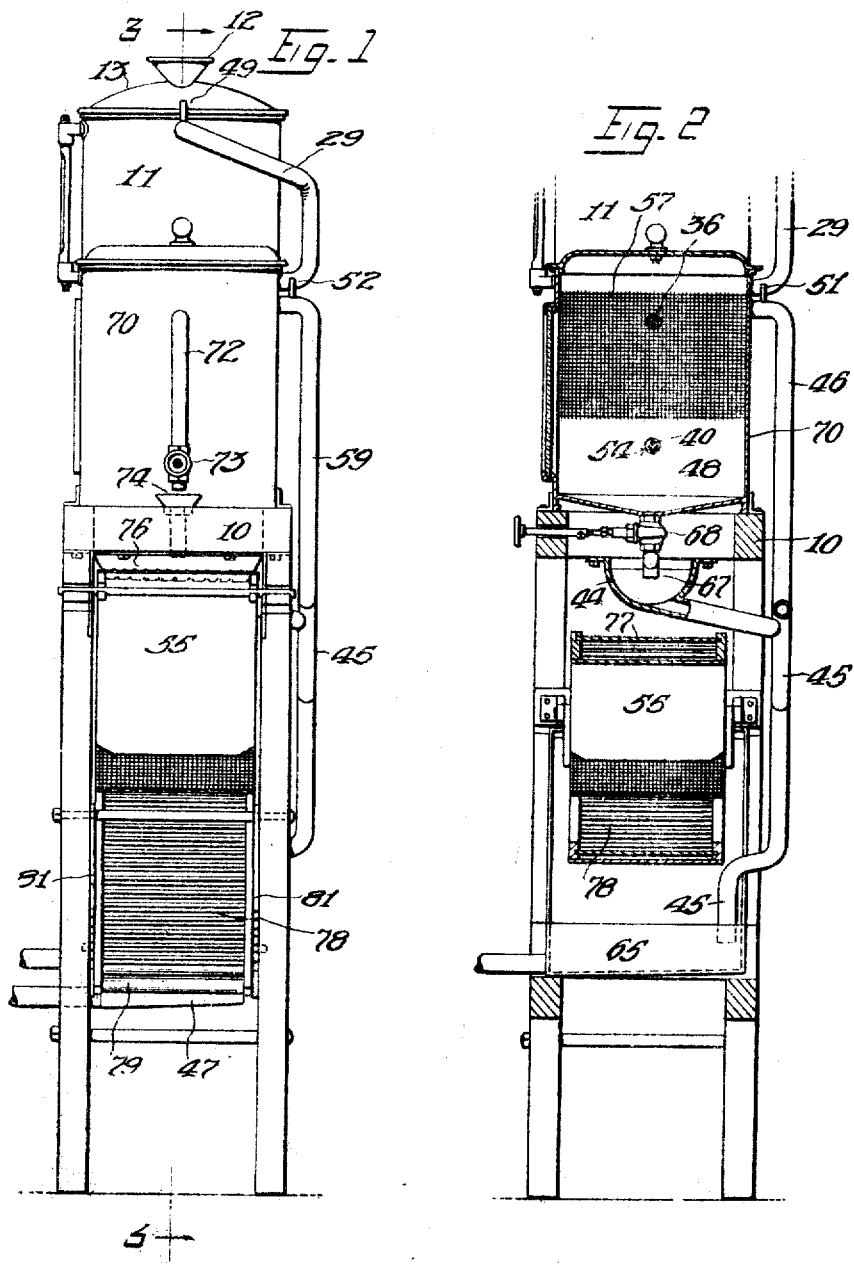

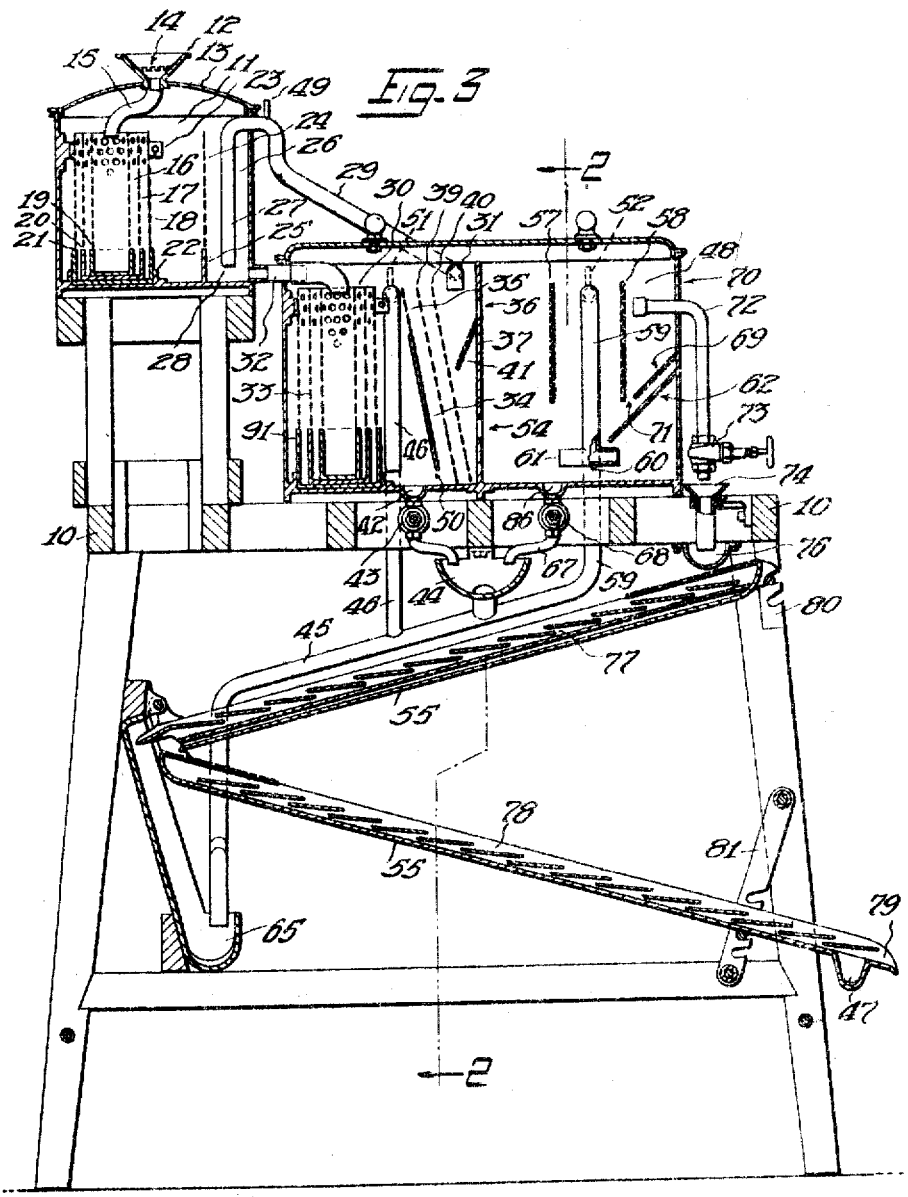

Patented July 17, 1923.

1,462,048

UNITED STATES PATENT OFFICE.

TREGARTHEN DAVIS RICHARDS, OF MARRICKVILLE, NEAR SYDNEY, NEW SOUTH WALES, AUSTRALIA.

APPARATUS FOR CLEANING AND CLARIFYING USED LUBRICATING OIL.

Application filed September 23, 1922. Serial No. 590,022.

*To all whom it may concern:*

Be it known that I, TREGARTHEN DAVIS RICHARDS, subject of the King of Great Britain and Ireland, residing at 46 Victoria Road, Marrickville, near Sydney, New South Wales, Australia, have invented new and useful Improvements in Apparatus for Cleaning and Clarifying Used Lubricating Oil, of which the following is a specification.

This invention relates to improvements in apparatus for recovering lubricating oils in a clean reusable condition from dirty used lubricating oil.

The dirty used oil is agitated in large proportions of water, preferably by steam blast, and thereby thoroughly intermixed, the extraneous matter is scrubbed and washed out during the flow of the emulsion-like mixture through vertically disposed fine wire gauze diaphragms. The cleaned oil is separated from the water by settling, and the extracted dirty matter is deposited in the treatment vessels in which the gauze diaphragms are fitted.

The recovery of usable oil from dirty waste oil is accomplished in this apparatus by repeatedly subdividing it whilst intermixed with water into minute threads or globules which suffer rubbing on the surfaces of the wire in the immersed gauze screens as it passes through the perforations in said screens in flowing through the treatment vessels. The process is therefore not a mere washing and filtering of the oil, in which there is no novelty. In the scrubbing and washing stages in my apparatus what might be termed a condition of incomplete or imperfect temporary emulsification is obtained and the emulsion-like mixture of oil and water is broken down in the separator stage. Effective cleaning of oil results from its treatment whilst in this emulsion-like condition. The process effected in the apparatus is therefore distinct from known processes in which a partial cleaning of dirty oil is effected by merely straining it whilst mixed with water under conditions in which the essential condition of repeatedly attenuating the oil in water to reduce it to extremely fine threads or globules by flowing through submersed gauze screens is not aimed at and is not procured in fact.

In the accompanying drawings,—

Fig. 1 is an end elevation of the apparatus;

Fig. 2 is a vertical transverse section on the plane 2—2 Fig. 3; and

Fig. 3 is a vertical longitudinal section on the plane 3—3 Fig. 1.

The parts of the apparatus below the bench 10 are not the subject of the present invention, but they are used in connection therewith for the completion of the operation of the earlier part of the apparatus in which the present invention consists.

In the primary scouring vessel 11 used dirty oil mixed with forty volumes of water more or less is caused to pass through a plurality of fine gauze screens which are submersed; it is thus subdivided into more or less minute threads or globules, so that an extensive surface is exposed to the water; and gritty and dirty non-oily matter are washed off. This scrubbing of the oil whilst it is in a condition of fine subdivision is repeated in the rewashing vessel 30, and in the final stage of treatment the water is separated from the cleaned oil. The extracted dirty and non-oily matter is precipitated.

A funnel 12 fitted in the cover plate 13 of the scouring vessel 11 is provided with a perforated strainer grating 14; from the funnel mouth a pipe 15 leads the agitated mixture of water and dirty oil which is run into the funnel 12, into a chamber which is constructed of three concentrically arranged cylinders, the upper parts of which are finely perforated, the lower parts being pan or cup bottoms which are not perforated. The innermost cylinder 16 is constructed of brass wire gauze about 25 gauge, the intermediate one 17 of brass wire gauze about 36 gauge, and the outer one 18 of brass wire gauze about 50 gauge, and there are annular clearance spaces between said cylinders. The pan or cup bottoms 19, 20 and 21 of these several cylinders are constructed of non-perforated sheet metal. The assembly of three concentric gauze cylinders is located in the vessel 11 on a seating 22 and by a bracket 23. 24 is a diaphragm extending across the chamber 11; it is constructed of 25 gauge brass wire gauze, but its lower-most part up to the level of the pan bottoms 19, 20 and 21 is formed as a solid plate cill 25. 26 is a take-off chamber on the rear side of the diaphragm 24; a short leg 27 of an overflow pipe is located in the compartment 26, its draw mouth 28 being positioned below the top of the cill 25 so that in discharging it draws from the bottom of the compartment; its long leg 29 passes into the rewashing vessel 30 at 31. 49 is an air vent nipple which functions to break vacuum in the pipe 27—29 and so to prevent siphon action. The bent pipe 27—29 functions to discharge the vessel 11 by drawing water from the bottom of it thus to maintain the top level of liquid in said vessel just below the top of the concentric cylinders.

During the passage of the mixed oil and water through the screens 16, 17, 18 and 24, successively the coarser and more easily removed extraneous heavy matter associated with the oil is released; some of it is deposited in the vessel 11, but the less readily separable portions of it are carried on with the oil. The deposit is collected in the bottoms of the pans 19, 20 and 21 and in the bottom of the vessel 11 forwardly of the cill 25 of the diaphragm 24. This deposited matter is removed from time to time.

The mixture of water and partially cleaned oil runs by gravity through the pipe 32 into the rewashing vessel 30. Overflow through the bent pipe 27—29 only happens when the pipe 32 does not carry off the liquid at a sufficient rate to prevent flooding of the vessel 11. The water-oil mixture is received in another triple walled chamber 33 in the vessel 30; this chamber is constructed similarly to the triple wall chamber contained in the vessel 11. Rearwardly of this triple wall chamber 33 an angularly disposed solid diaphragm 34 is fixed across the chamber 30, 50 being a clearance space below this diaphragm. The top edge of the solid diaphragm 34 is set about level with an oil flow hole 36, which is pierced through the end plate 37 of the chamber 30. Above this solid top edge a continuing perforated diaphragm consisting of 25 gauge brass wire gauze 35 forms an upward extension of said diaphragm 34. Parallel with the diaphragm 34 and spaced with a little clearance rearwardly of it and separate from each other are two diaphragms 39 and 40 constructed respectively of 36 gauge brass wire gauze and 50 gauge brass wire gauze. 41 is a baffle splayed angularly forwardly, and extending downwardly from the wall 37 at the level of the bottom edge of the oil flow aperture 36 therethrough. The oily liquid in successively passing through the gauze walls of the chamber 33 and the screens 39 and 40 thereby suffers a further scrubbing in the intermixed water, so that substantially all the adherent carbon and other extraneous matter is washed out of it. The deposited mud is collected in the pans 91 of the triple wall chamber 33 and in the bottom of the vessel 30. The latter deposit may be drawn off from time to time through the sump 42 by opening a cock 43 to allow it to pass to the collecting funnel 44 and thence to the waste pipe line 45; the cock 43 is opened from time to time as found necessary. 46 is the short leg of an inverted U-pipe the bend of which is set above the top of the aperture 36; and slightly below the top of the triple cylinder chamber 33. 51 is an air leak nipple in the top of the bend; the long leg of this pipe is connected into the waste pipe 45. The liquid level in the vessel 30 is prevented from rising above the top of the chamber 33 by discharge of water from the bottom of it through this U-pipe into the waste pipe 45. The oily stratum at the top of the liquid in the vessel 30 carries some water, and the watery stratum at the bottom of it carries some oil. Water flows through the bottom clearance space 50 into the rear part of the vessel 30, passing through the screens 39 and flowing thence through the aperture 54 into the lower part of the separator vessel 48. The oil which floats above the top of the diaphragm 34 flows through the screens 39 and 40 and the flow aperture 36 into the upper part of the separator vessel 48. Oil discharged from the watery strata in the lower part of the vessel 30 ascends to the oily stratum at the top. Any ascending oil which is trapped below the baffle 41 passes up through it; this baffle checks any upward surging movement by which water would be forced up along the wall 37 into the oily stratum.

The separator vessel 48 is fitted in the upper part of it with two 25-gauge brass wire diaphragms 57 and 58. An inverted U-tube 59 with T-mouth 60 is accommodated between the diaphragms 57 and 58; its intake mouth 61 is located below the angularly solid plate baffle 62. 52 is an air vent in the bend of this pipe to break vacuum in it. The long leg of this U-pipe is an extension of the waste pipe 45. The bend of the U-pipe 52 is set at the same level as the bend of the U-pipe 46. 65 is a waste gutter into which U-pipe waste pipe 45 is led. 86 is a sump in the bottom of the vessel 48. 67 is a pipe leading therefrom through a valve 68 to the sump funnel 44 for the eduction of slimy or other precipitated matter which has been collected in the bottom of the vessel 48. An angularly disposed baffle of 25 gauge wire gauze 69 is placed above the baffle 62 and fixed to the back end wall 70 of the vessel 48. Between its lower forward end and the gauze diaphragm 58 is a clearance space 71. 72 is a clean oil take-off pipe, the intake mouth of which is set a little below the level of the U-pipe bends and about the same level as the oil flow aperture 36. 73 is a valve in the pipe 72. 74 is a funnel into which cleaned oil educted by the pipe 72 is run for delivery into a distributor 76, whence the oil passes onto the louvre tables 77 and 78 and is thereon freed from light volatile and mobile oily constituents and water.

Gauge glasses (not shown) are fitted to the several vessels for indicating the liquid levels thereon respectively.

The finished cleaned oil is delivered from the channel 47 at the foot of the lower louvre table 78 ready for re-use, whilst the rejected liquids pass over the spout 79 to waste. This final purification is effected by capillary action by reason of which the oil is caused to move in films inwardly between the close set slats onto the catch trays 55, whilst water and other very mobile constituents flow away over the slats. 80 and 81 are notched carriers by means of which the angles of dip of the louvre tables 77 and 78 are set.

It is to be understood that the respective first, second, and third vessels of the cleaning system 11, 30 and 48 may be set up and interconnected in any convenient arrangement provided they are disposed for operation in series so that liquid passes successively through them at a regular slow rate and the levels of the liquids are maintained as described. The flow must be sufficiently smooth to permit the necessary stratification to take place for the separation of substantially all the oil from the water in the separator vessel 48. The oil educted through the pipe 72 is substantially clean and contains only an accidental small proportion of water and kerosene or like light mobile oils which were intermixed in the original oil.

Oil to be cleaned and reconditioned is delivered into the funnel 14 with water. Forty volumes of water per one volume of oil (more or less) is desirable. The oil is first intermixed with the water; this intermixture is best made by blowing steam through the mixture to agitate it. A greater or less proportion of water may be used, better results being obtained when the proportion of water used is high. The mixture of water and oil, which may be agitated by steam, suffers a preliminary screening for the removal of solid impurities at the coarse gauze grating 14, thence being delivered into the inner screen chamber 16 in a condition of considerable agitation. The mixed water and oil flow through the several gauze screens successively in the scouring vessel 11 and in the rewashing vessel 30. The oil threads or globules suffer mechanical scrubbing in the water during movement through the gauzes. To minimize fouling of the vessels with greasy matter, more or less caustic alkali may be added to the washwater, a very small proportion of alkali only being necessary to maintain the vessels in a clean condition during the process. An alkaline condition in the water thus results in maintaining clear passages through the gauze for flow of oil and water therethrough. The extraneous matter which is rubbed off the finely subdivided oil whilst it is flowing through the screens 16, 17, and 18 successively, is precipitated in the pan bottoms 19, 20 and 21. A limited amount of precipitated mud is also found in the bottom of the rear portion of the vessel 11 forwardly of the diaphragm 24.

The mixture of water and partially scrubbed oil flows through the pipe 32 and drops therefrom into the innermost cell of the triple wall chamber 33 in the rewashing vessel 30, and a repetition of the washing takes place in that chamber. Thereafter, in the rear part of the rewashing vessel 30, the outflowing liquids stratify by gravity, the oil floating above the water. The water passes below the diaphragm 34 and then goes through the diaphragm screens 39 and 40; some of it rises to the gauze baffle 41. The floating oil passes above the diaphragm 34 through the gauze upper extension of it (35) and thence through the gauze diaphragms 39 and 40. The bulk of the water still remaining in the rewashing vessel and the separator vessel passes through the aperture 54 in the wall 37, and the oil passes through that wall by the aperture 36. A slow even rate of flow is maintained so that an agitated condition is not produced in the rear part of the vessel 30 or in the separator vessel 48. A quiescent condition is essential in order to promote gravity stratification of the oil from the water. The cleaned oil is educted through the pipe 72 and further treated to remove residual water and light mobile oils on the louvre trays 77—78. The clean oil finally passes to a container through the gutter 47. It shows very little trace of previous use, and is a quite effective lubricant approximating to the value of the original oil, and it may be used therefore in conjunction with or in substitution for new oil for the lubrication of machinery and the like. The mud deposited during the separation of water from oil is collected in the sumps 42 and 86 and is educted through the pipe 45.

When the vessels are emptied for periodical cleaning, any mud which may be found collected on the gauze baffle 69 runs off through the clearance space 71.

What I claim as my invention and desire to secure by Letters Patent is:—

1. Apparatus for recovering clean oils from dirty used lubricating oils by water washing the same whilst in a minutely subdivided condition, said apparatus consisting essentially of a plurality of vessels fitted respectively with diaphragms of fine wire gauze with clearance spaces intervening them, said diaphragms disposed substantially vertically and across the direction of flow of liquid through said vessels, means for maintaining a uniform level of liquid in said vessels submersing said diaphragms, means for introducing an agitated mixture of dirty oil and water forward of the terminal screen at the end of one of said vessels, means for reagitating the mixed oil and water during its course through said vessels, a separator vessel connected serially with the wash vessels, means for removing water from the bottom strata in all said vessels and clean oil from the top stratum in said separator vessel, and means for removing deposited foreign matter from all said vessels.

2. Apparatus for recovering clean oils from dirty used lubricating oils comprising a plurality of vessels through which dirty used oil intermixed with water is caused to flow is fitted with a plurality of fine wire gauze diaphragms spaced apart and arranged substantially vertically and transversely of the direction of flow of the oil-water mixture and immersed in said mixture, that each diaphragm is provided with a non-perforated pan bottom, that an independent gauze diaphragm is mounted in each vessel in front of the delivery outlets, and that each vessel is provided with a non-siphoning overflow pipe to maintain a constant level of the oil-water mixture.

3. Apparatus for recovering clean oils from dirty used lubricating oils comprising two washing vessels one fixed above the other and a separator vessel connected to the lower washing vessel, a plurality of concentric wire gauze diaphragms of varying mesh in each washing vessel, a non-perforated pan bottom for each diaphragm, a lower delivery outlet in the first washing vessel to deliver a partly cleansed mixture of oil and water into the second washing vessel, a delivery pipe in each washing vessel to remove excess of water and maintain a constant level of oil-water mixture in each washing vessel, a single vertical gauze plate diaphragm in the first washing vessel forward of the delivery oulets, a series of inclined gauze plate diaphragms in the second washing vessel, a dividing wall separating said second washing vessel from the separator vessel, an upper and a lower aperture in said dividing wall, and an inclined baffle plate mounted on said wall below the upper aperture and depending into said second washing vessel.

4. Apparatus for recovering clean oils from dirty used lubricating oils, comprising two washing vessels, one fixed above the other and a separator vessel following the lower washing vessel, a group of three concentric diaphragms of fine wire gauze in each of said washing vessels, fine wire gauze diaphragms across said washing vessels rearward of the concentric diaphragms therein, nonperforated pan bottoms on said concentric diaphragms, means for delivering the feed of mixed oil and water into said concentric diaphragms, so as to procure an agitated condition of the mixed liquids therein, a separator vessel connected to the end of the second washing vessel at high level and also at low level said separator vessel adapted to effect gravity separation of oil from water, means for educting floating oil from said separator vessel, and means for educting water from all of said vessels continuously to maintain a uniform liquid level in them.

5. Apparatus for recovering clean oils from dirty used lubricating oils, comprising a scrubbing vessel, a plurality of fine mesh gauze wire diaphragms in said vessel, arranged concentrically with the innermost one forming a receiving chamber for an agitated mixture of water and dirty oil, solid pan bottoms on said diaphragms, a fine gauze wire diaphragm across said vessel into said rewashing vessel, a corresponding arrangement of concentric and transverse diaphragms in a rewashing vessel arranged at a lower lever with a pipe arranged for gravity delivery of the mixed scrubbed liquid in an agitated condition from the scrubbing vessel, means for maintaining all said diaphragms immersed in the flowing liquids and a separator vessel with high level and low level connections from the rewashing vessel, and with educting means for water and clean oil respectively, said separator vessel adapted to hold the liquids quiescently to enable gravity separation therein of oil from water.

In testimony whereof I have signed my name to this specification.

TREGARTHEN DAVIS RICHARDS.

Certificate of Correction.

It is hereby certified that in Letters Patent No. 1,462,048, granted July 17, 1923, for an improvement in "Apparatus for Cleaning and Clarifying Used Lubricating Oil," the name of the patentee is erroneously written and printed as "Tregarthen Davis Richards," whereas said name should have been written and printed as *Tregarthen Davies Richards;* and that the said Letters Patent should be read with this correction therein that the same may conform to the record of the case in the Patent Office.

Signed and sealed this 9th day of October, A. D., 1923.

[SEAL.]
WM. A. KINNAN,
*Acting Commissioner of Patents.*